United States Patent [19]

Oberman et al.

[11] 4,449,185
[45] May 15, 1984

[54] IMPLEMENTATION OF INSTRUCTION FOR A BRANCH WHICH CAN CROSS ONE PAGE BOUNDARY

[75] Inventors: Joel R. Oberman, Somerville; Russell G. Ott, Cranford, both of N.J.

[73] Assignee: RCA Corporation, New York, N.Y.

[21] Appl. No.: 326,162

[22] Filed: Nov. 30, 1981

[51] Int. Cl.³ ............................................... G06F 9/32
[52] U.S. Cl. ................................................... 364/200
[58] Field of Search ... 364/200 MS File, 900 MS File

[56] References Cited

U.S. PATENT DOCUMENTS

| | | | |
|---|---|---|---|
| 3,623,157 | 11/1971 | Stapleford | 364/900 |
| 3,728,689 | 4/1973 | Edwards, Jr. | 364/200 |
| 3,728,690 | 4/1973 | Hotley et al. | 364/200 |
| 3,786,436 | 1/1974 | Zelinski et al. | 364/200 |
| 4,016,545 | 4/1977 | Lipovski | 364/200 |
| 4,156,905 | 5/1979 | Fassbender | 364/900 |
| 4,179,738 | 12/1979 | Fairchild et al. | 364/200 |
| 4,195,339 | 3/1980 | Smith et al. | 364/900 |

*Primary Examiner*—Jerry Smith
*Assistant Examiner*—Mark P. Watson
*Attorney, Agent, or Firm*—J. S. Tripoli; R. L. Troike; D. W. Phillion

[57] ABSTRACT

In a data processing system having a memory and employing N-bit bytes and two byte addresses, a branch instruction which can cross one page boundary is executed without having to use calculations to effect a change in the contents of the program counter (PC). It is determined whether the value V1 of the (N−1) least significant bits (LSB's) of the lower order byte of the two byte branch address is greater or less than the value V2 of the (N−1) least significant bits (LSB's) of the lower order byte of the address to which the PC is pointing and also whether PC N≠BR N where PC N and BR N are the most significant bits of the lower order bytes of the PC address and the branch address, respectively. If V1<V2, PC N=1, and PC N≠BR N, the upper order byte of the PC address is incremented by 1 and if V1>V2, PC N=0, and PC N≠BR 7, the upper order byte of the PC address is decremented by 1.

3 Claims, 12 Drawing Figures

| I | II OUTPUT OF AND GATE 207 | III OUTPUT OF NOR GATE 203 | IV OUTPUT OF XOR GATE 205 | V OUTPUT OF AND GATE 204 | VI OUTPUT OF AND GATE 208 | VII DEC- REMENT | VIII INC- REMENT |
|---|---|---|---|---|---|---|---|
| (A) FIG. 1 | 0 | 0 | 1 | 0 | 0 | NO | NO |
| (B) FIG. 2 | 0 | 1 | 0 | 0 | 0 | NO | NO |
| (C) FIG. 3 | 0 | 1 | 1 | 0 | 1 | YES | NO |
| (D) FIG. 4 | 0 | 0 | 0 | 0 | 0 | NO | NO |
| (E) FIG. 5 | 0 | 0 | 0 | 0 | 0 | NO | NO |
| (F) FIG. 6 | 1 | 0 | 1 | 1 | 0 | NO | YES |
| (G) FIG. 7 | 0 | 0 | 1 | 0 | 0 | NO | NO |
| (H) FIG. 8 | 1 | 0 | 0 | 0 | 0 | NO | NO |

Fig. 12

| I | II | III | IV | V | VI | VII | VIII | IX |
|---|---|---|---|---|---|---|---|---|
| EXAMPLE REPRESENTED | FORWARD BRANCH (FBR) | BACKWARD BRANCH (BBR) | PC 7 | BR 7 | TRUE FORWARD BRANCH | TRUE BACKWARD BRANCH | DECREMENT | INCREMENT |
| | TENTATIVE DECISION= YES=1 ON INPUT LEAD 200 OF AND GATE 207 OF FIG. 10 | TENTATIVE DECISION= YES=1 ON INPUT LEAD 199 OF INVERTER 221 (NOR GATE 203) OF FIG. 10 | BOUNDARY LINE NOT CROSSED IF PC 7=BR 7 (INPUTS TO XOR GATE 205) | | | | SEE NOTE 2 BELOW | SEE NOTE 1 BELOW |
| (A) FIG. 1 | 1 | 0 | 0 | 1 | YES | | | |
| (B) FIG. 2 | 0 | 1 | 0 | 0 | YES | NO | NO | NO |
| (C) FIG. 3 | 0 | 1 | 0 | 1 | NO | YES | YES | NO |
| (D) FIG. 4 | 1 | 0 | 1 | 0 | NO | YES | NO | NO |
| (E) FIG. 5 | 1 | 0 | 1 | 1 | YES | NO | NO | NO |
| (F) FIG. 6 | 0 | 1 | 1 | 0 | YES | NO | NO | YES |
| (G) FIG. 7 | 0 | 1 | 1 | 1 | NO | YES | NO | NO |
| (H) FIG. 8 | 1 | 0 | 1 | 1 | NO | YES | NO | NO |

NOTE 1
CONDITIONS TO INCREMENT-PC 7=BR 7, PC 7=0, FBR=1
(ONLY CONDITIONS OF FIG. 6 INCREMENTS)

NOTE 2
CONDITIONS TO DECREMENT-PC 7=BR 7, PC 7=0, BR 7=1, BBR=1
(ONLY CONDITIONS OF FIG. 3 DECREMENT)

Fig. 11

IMPLEMENTATION OF INSTRUCTION FOR A BRANCH WHICH CAN CROSS ONE PAGE BOUNDARY

This invention relates to an improved method and system for executing branch instructions and more particularly, for executing an instruction which directs a branch which can be either to a location within the same page of the memory or to a location across one page boundary.

The main memories of most modern data processors are divided into pages with each page having a number of memory locations. For example, with a 16-bit (two 8-bit bytes) address system, the 8-bit lower order byte can be employed to define 256 memory locations on a given page since $2^8 = 256$. The 8-bit upper order byte can then be employed to define 256 ($2^8$) pages rather than the individual memory locations on the page. In such a system, a branch from the page containing the memory location to which the main memory program counter (PC) is pointing, to another page is indicated by the incrementing or decrementing of the upper order byte whereas a branch within the same page does not result in the incrementing or decrementing of the upper order byte of the address.

There are, in general, three types of branch instructions currently in use. One is defined as a short branch instruction and it directs a branch within a given page of a memory system. A long branch instruction is defined as one that directs a branch from any page to any other page and, in this example, is one that directs a branch from one memory location to a second memory location more than 256 memory locations away.

Both the short branch and the long branch are effected by loading the contents (usually the starting address of a subroutine) of the branch instruction into the main program counter (PC) of the system. The original contents of the PC are usually saved, to be reloaded into the PC after the accessed subroutine has been executed.

The third type branch, the relative branch, is one in which, in the prior art, the existing contents of the PC are changed by calculation, i.e., by adding or subtracting a binary value to the contents of the PC to produce the branch instruction address, which might cross no page boundaries or which might cross several page boundaries. More specifically, the relative branch instruction of the prior art is effected by first computing the change required in the upper and lower bytes of the contents of the program counter and then adding or subtracting the calculated change to the contents of the PC, with the new value defining the address of the relative branch.

From the foregoing, it is evident that since relative branches might or might not cross page boundaries, there can be short or long branches which are relative branches involving calculation.

The present invention presents an entirely new branching technique which is in between a short and a long branch and which does not require the calculations described above and employed in the prior art to produce a relative branch instruction. More specifically, this new branch is defined herein as an "extended short branch" and has a branching range equal to the length of a full page, i.e., up to 127 memory locations in one direction and up to 128 memory locations in the other direction from the particular memory address to which the PC program is pointing, in the example being discussed. Depending upon the address stored in the PC, the extended short branch can cross a page boundary into either the preceding page or into the following page, or can cross no page boundaries. Since no calculations are required, less logic is needed than with relative branching.

Thus, the "extended short branch" is in fact, a short branch which is independent of the boundaries of the adjacent pages and which requires no calculations, as would a relative branch.

Unless otherwise specified, references to "branches" herein will mean extended short branches.

In accordance with a preferred form of the invention there is provided, in a data processing system having a memory and employing N-bit bytes and two byte addresses, an improved apparatus and method for executing extended short branches independent of adjacent page boundaries in the memory where a page is $2^N$ address locations, and comprising the steps of determining if the value (V1) of the N-1) least significant bits (LSB's) of the lower order byte of the branch address is greater or less than the value (V2) of the (N−1) LSB's of the lower order byte of the address to which the system program counter (PC) is pointing, determining if PC N≠BR N, where PC N and BR N are the most significant bits of the lower order bytes of the PC address and the branch address, respectively, incrementing by 1 the upper order byte of the PC address if V1<V2, PC N=1 and PC N≠BR N, and decrementing by 1 the upper order byte of the branch address if V1>V2, PC N=0 and PC N≠BR N. Under all conditions, the lower order byte of the PC address is replaced by the branch address. No computations are required.

Before proceeding with a detailed description of the invention and using FIGS. 1-3 as references, certain principles, premises, and definitions used herein will first be discussed and defined.

Figure 1:
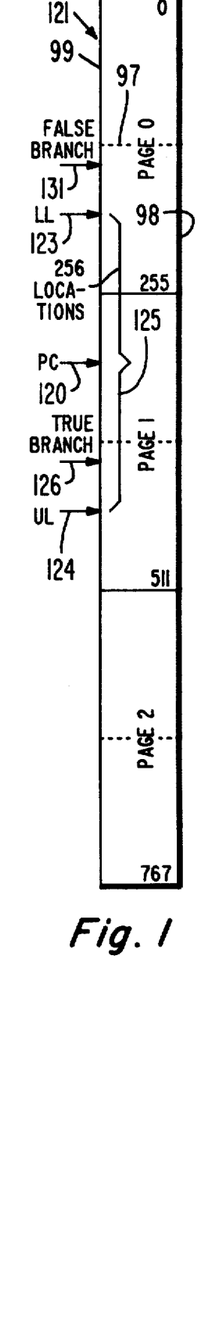
FIG. 1 is a schematic representation of three pages of memory and shows an example of a forward branch to the first half of a given page when the program counter is pointing to said same half page.

In FIG. 1, three consecutive pages of memory 121 are represented schematically by blocks labelled "PAGE 0," "PAGE 1," and "PAGE 2." Each page, such as page 0, for example, is divided (as represented by dashed line 97) into a lower order half page 99 containing lower order memory locations 0-127, and an upper order half page 98 containing higher order memory locations 128-255.

In FIG. 1 the program counter (PC) of the processor is pointing at an address indicated by arrow 120 in the lower order half page of page 1 of memory 121, which address is defined herein as the "PC address 120."

The limits of an extended short branch in FIG. 1 are defined by bracket 125 which extends into the upper order half page of page 0 and also into the upper order half page of page 1. By definition herein, an extended short branch can be made backwards up to 128 memory locations and forward up to 127 memory locations. In FIG. 1, the lower limit of the backward branch is designated by the letters LL and the arrow 123. The upper limit of the forward branch is designated by the letters UL and the arrow 124. Thus, there is a total of 256 word locations within bracket 125, including the PC address 120. In the present technique, any branch falling outside the lower and upper limits indicated by arrows 123 and 124 is an invalid or false branch. A true branch must lie within the bracket 125.

A forward branch is sometimes referred to herein as an FBR, and a backward branch as a BBR. The letters "BR" means both forward and backward branch instructions.

Figure 3:
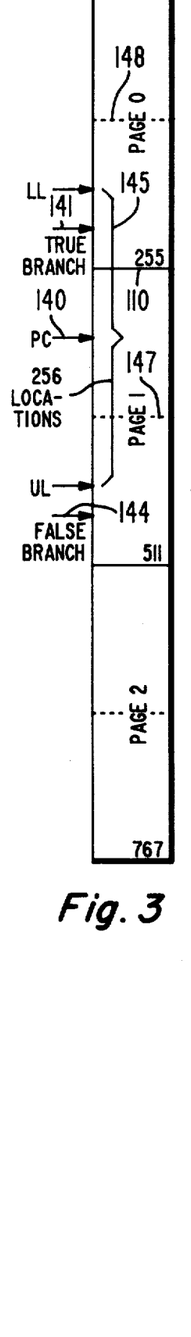
FIG. 3 is a schematic representation of three pages of memory and shows the case of a backward branch to the second half of the preceding page when the program counter is pointing to the first half of the following page, thereby crossing a page boundary with the branch.

It is a premise of this invention that only the lower order 8-bit byte of a 16-bit 2 byte address will be employed to effect a branch instruction even though such instruction should cross a page boundary as shown, for example, in FIG. 3 where page boundary 110 is crossed. There are 8 bits in the lower order byte of an address. A particular bit of the PC address is defined as PC 0, PC 1-PC7. PC 7 is the MSB (the eighth bit) of the lower order byte of the address to which the PC is pointing. A particular bit of the branch address is defined as BR 0-BR 7 where BR 7 is the most significant bit (MSB) which is the eighth bit of the lower order byte of the branch address. However, when the first 7 bits of the lower order byte of an address are being referred to they will be referred to as the seven least significant bits (LSB's).

The 7 LSB's of the lower order byte of any address define the particular word location in any given half page of memory. More specifically, each half page of every page of the memory has a location which is defined by the same 7 LSB's. The eighth bit (which can be either a 0 or a 1) of the lower order byte of the address defines the lower or upper order half of a page. The upper order byte of the address, not used here n except to increment or decrement, defines the page.

Each full 8-bit lower order byte defines a corresponding location on each page of the memory. Thus, each full 8-bit lower order byte will define a location on the page to which the PC is pointing and also a corresponding location on the preceding page and on the following page. Since a valid extended short branch can be made backwards a distance of one-half page or 128 memory locations and forward 127 memory locations, it is obvious that no branch, either forward or backward, can extend to a location beyond the adjacent page and more specifically, no valid branch can direct a move to a new location beyond that half of the page which is adjacent to the page to which the PC is pointing. An invalid or false branch address, however, can fall into a half page not adjacent to the half page to which the PC is pointing (see, for example, FIG. 2, false branch pointer 111).

If the PC is pointing to the lower order half of a given page, a valid branch instruction can direct a branch to a location across a boundary line only by a backward branch, because of the limitations on the distance of a valid branch. In such case, the branch will be to the upper order half of the preceding page. In a similar manner, if the PC is pointing to the upper order half of a given page, a valid branch instruction can direct a branch to a location across a boundary line only by a forward branch to the lower order half of the following, that is, the higher numbered page. Thus, in FIGS. 1-4, a boundary line can only be crossed from page 1 back to page 0 since, in each case, the PC addresses 120, 100, 140 and 160 are pointing to a location in the lower order half of page 1. In FIGS. 5-8, a page boundary can only be crossed in response to a branch instruction, to the lower order half of subsequent page 2 since the respective PC addresses 300, 320, 340 and 360 are located in the upper order half of page 1. It is apparent from an examination of FIGS. 1-8, that in all cases a valid extended short branch instruction can be made to the same page to which the PC is pointing.

There are 8 combinations of valid branches shown in FIGS. 1-8. These consist of four in which the PC initially is pointing to the lower order half of a page (FIGS. 1-4) and four in which the PC initially is pointing to the upper order half of a page (FIGS. 5-8). When the PC is pointing to the lower order half of a given page, the four possible valid branches are: two forward branches, one to the lower order half of the same page to which the PC is pointing, and the other to the same half of said given page; and two backward branches, one in the same half page as the one to which the PC is pointing, and the other to the upper order half page of the immediately preceding page.

The other four branch possibilities exist when the PC is pointing to the upper order half of a given page. In such a case the four branch possibilities are two forward branches, one within the same half page as the PC address and one to the lower order half page of the subsequent page and two backward branches, one in the same half page as the PC address and one to the lower order half of the same page in the PC address.

The determination in each of these 8 cases as to which of the two possible locations (the backward or forward possibility) is the true branch is determined by certain parameters including PC 7, BR 7, and the comparative value of the 7 LSB's of the PC address, designated herein as V2 and the 7 LSB's of the BR address, designated herein as V1. If V2>V1, that is, the value of the 7 LSB's of the PC address is greater than the value of the 7 LSB's of the BR address, then the PC is pointing to an address on its half page which is greater than the branch address on the half page to which the branch instruction has commanded a branch. This is illustrated in FIG. 1 where the 7 LSB's of the PC address 120 have a value V2 which is greater than the value V1 of the 7 LSB's of the branch addresses 126 or 131. The position of 120 (the PC address) represents an address which is of greater value, i.e. a larger number on its half page, than do the positions on their half pages of the true branch address 126 or the false branch address 131.

Figure 9:
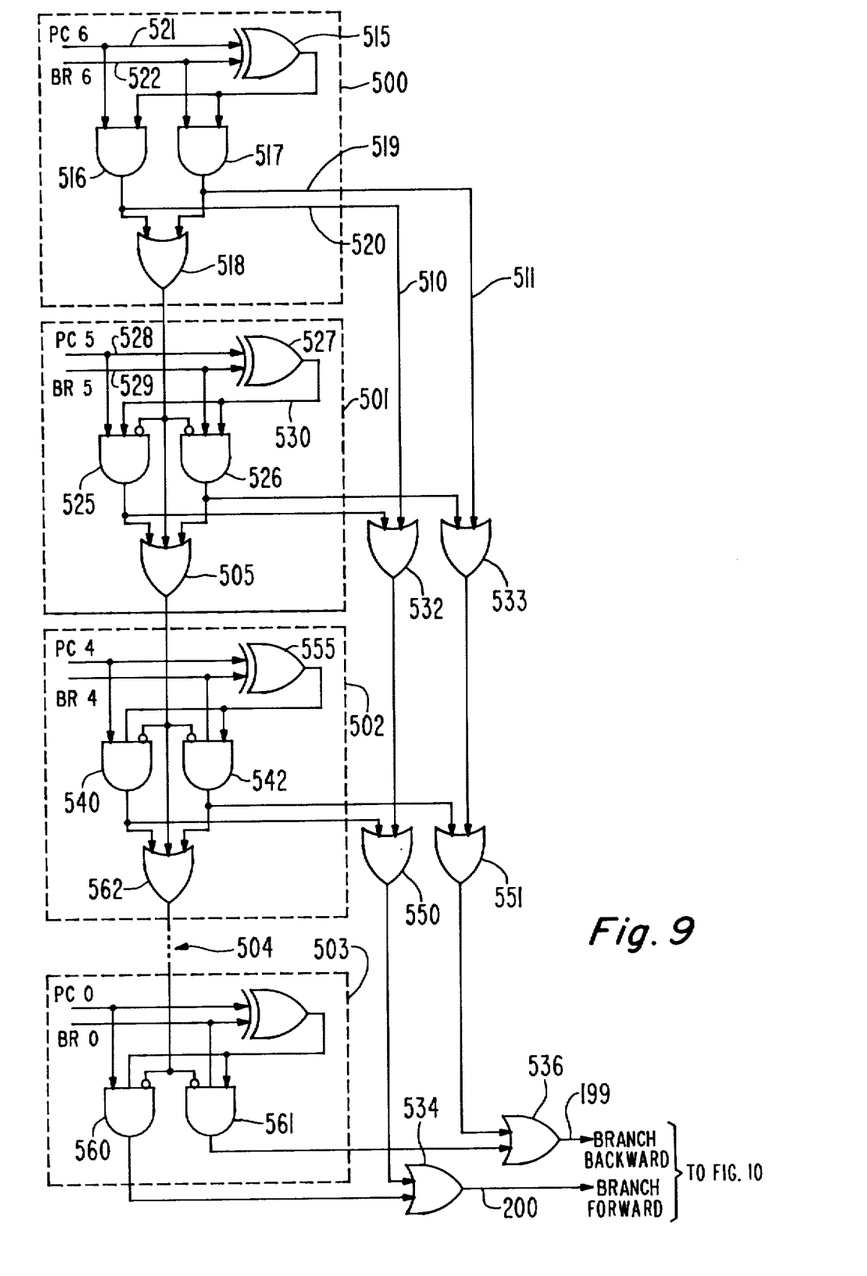
FIG. 9 is a logic diagram for determining which of the (N−1) LSB's of the PC address or the branch address is the larger.

Such comparative values of V1 and V2 are calculated by the logic of FIG. 9 which makes a tentative decision as to whether the branch is a forward branch (FBR) or a backward branch (BBR). Specifically, if V2>V1 (as illustrated in FIG. 1), the logic of FIG. 9 makes a tentative decision that the branch is a forward branch. It is to be understood, however, that such a decision is only tentative and can be reversed by the logic of FIG. 10. In other words, there are instances where V2>V1 and yet the true branch is a backward branch (BBR) as, for example, shown in FIG. 4.

Figure 10:
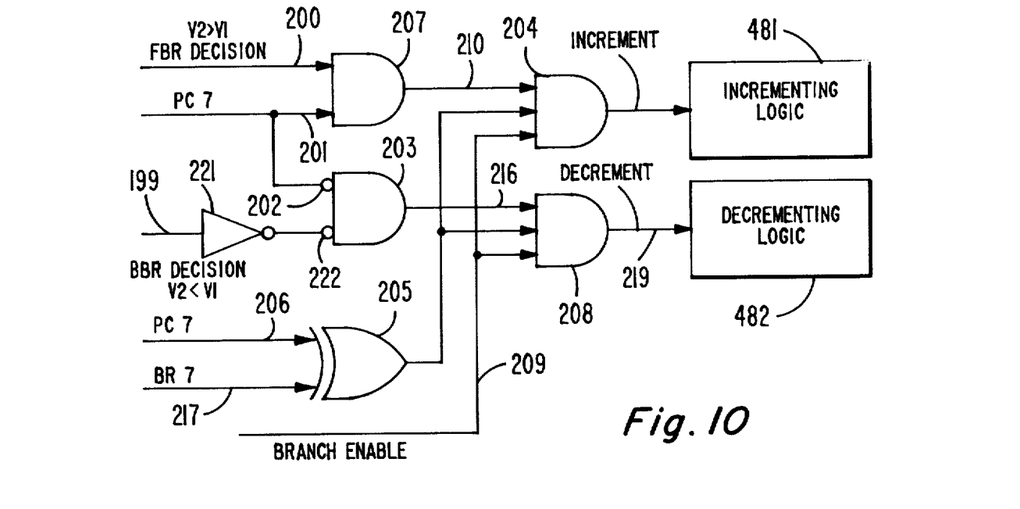
FIG. 10 is a logic diagram for determining if a page boundary has been crossed.

Consider now the case of FIG. 1 with respect to FIG. 10 as an example of how the logic of FIG. 10 reviews the decision made by the logic of FIG. 9. As indicated above, the logic of FIG. 9 indicates an FBR since the 7 LSB's of the PC address 120 is greater than the 7 LSB's of the branch addresses 126 and 131, i.e., V2>V1. In FIG. 9, the FBR determination is indicated by a 1 level on output 200 thereof, which is supplied to lead 200 of FIG. 10. A 0 appears on output lead 199 of FIG. 10 indicating tentatively that a BBR has not occurred.

Referring now specifically to FIG. 10, the indication of an FBR has been supplied to input 200 of AND gate 207. The value of PC 7 is 0 since PC address 120 is in the lower order half of a page, page 1 in this instance. Therefore, the output of AND gate 207 will also be a 0 as well as the output of AND gate 204 so that no incrementing of the least significant bit of the upper byte of the PC address will occur, which is consistent with the condition shown in FIG. 1 where the true branch address 126 lies in the same page as does the PC address 120.

The 0 value of PC 7 is inverted to a 1 at the input 202 of NOR gate 203. However, the 0 value supplied to the input inverter 221 from lead 199 of FIG. 10, indicating no backward branch, results in a 1 being supplied to input 222 of NOR gate 203, thereby disabling NOR gate 203 and consequently also disabling AND gate 208. Thus, decrementing logic 482 will not be enabled so that no decrementing of the LSB of the upper byte of the PC address will occur.

Since both AND gates 204 and 208 are disabled and no change is made in the LSB of the upper byte of the PC address, the branch address selected is branch address 126 which is located on the same page as the PC address 120 and can be seen to be the true branch address.

Figure 11:
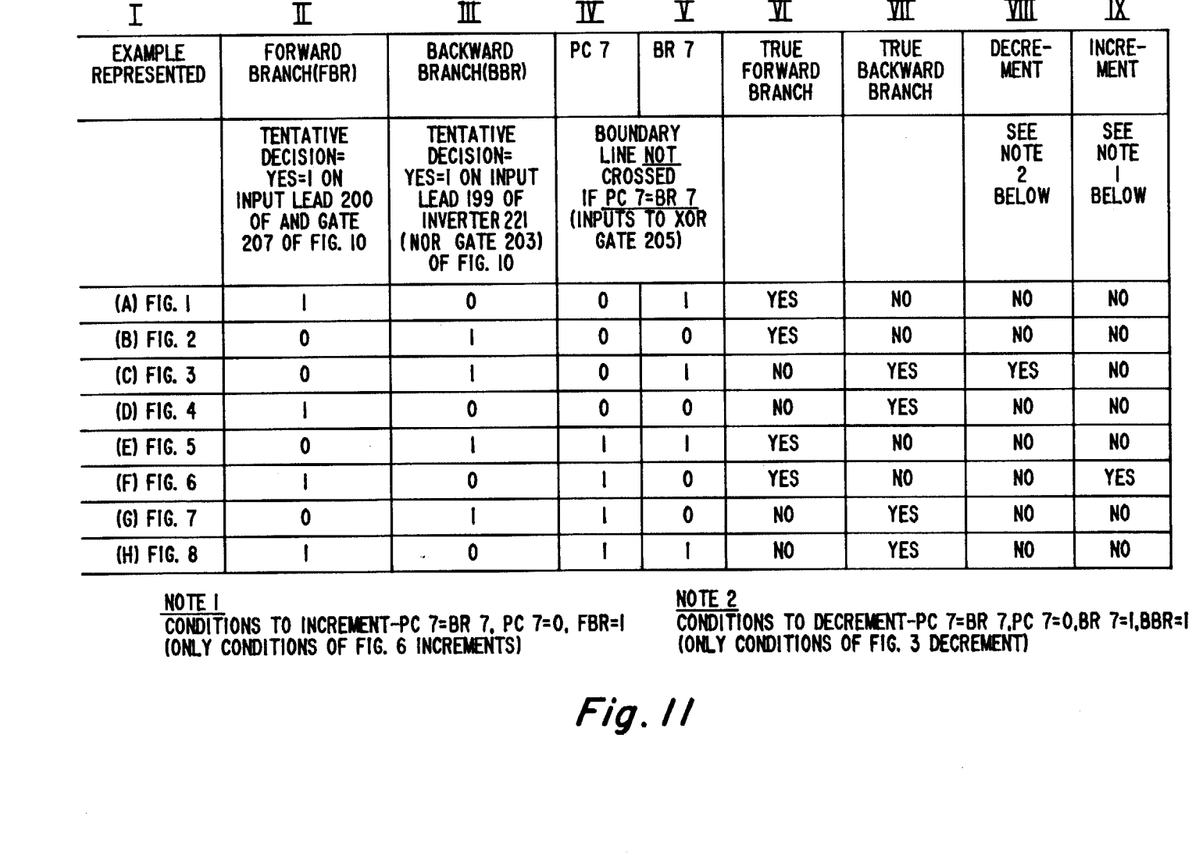
FIG. 11 is a truth table showing inputs to the logic of FIG. 10.

It should be noted that inputs PC 7 and BR 7 supplied to the inputs 206 and 217 of Exclusive OR (XOR) gate 205 will result in a 1 being supplied therefrom to AND gates 204 and 208 since PC 7≠BR 7. Such a 1 output from XOR gate 205 is necessary in order to enable either AND gate 204 or AND gate 208 to increment or decrement the LSB of the upper byte of the PC address when a page boundary has been crossed. In the case of FIG. 1, no page boundary was crossed (this is illustrated in the table of FIG. 11) and this is manifested by the disabling of gates 207 and 203 (recall that the PC address is in a lower order page and PC 7 is 0 so that gate 207 is disabled, and there is a 0 on lead 199 indicating no backward branch so that gate 203 is also disabled). The condition of XOR gate 205 is irrelevant in the case of FIG. 1.

It is evident from the immediately prior discussion that energization of one of either AND gate 207 or NOR gate 203 plus the enabling of XOR gate 205 is required in order to enable either AND gate 204 or 208, and thereby either increment or decrement the LSB of the upper byte of the PC address indicating that a page boundary line has been crossed.

Figure 12:
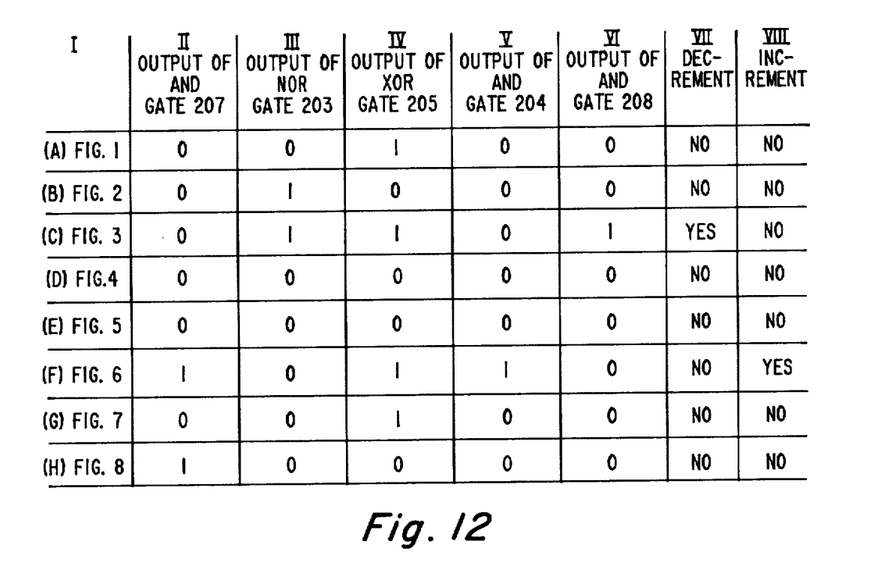
FIG. 12 is a truth table showing the outputs and conclusions of the logic of FIG. 10.

The truth table of FIG. 12 illustrates the foregoing for each of the 8 cases of FIGS. 1-8. In FIG. 12 column I represents the figure being considered, columns II-VI represent the outputs of the various gates of FIG. 10, and columns VII and VIII show the decision to decrement or increment.

In the example of FIG. 1 being discussed, it can be seen from FIG. 12 that AND gate 207 and NOR gate 203 are disabled and their outputs are a 0 level. Thus, even though XOR gate 205 outputs a 1 level, the AND gates 204 and 208 are disabled so that no decrementing or incrementing occurs.

FIG. 11 is another truth table showing the inputs to the various gates 207, 203, and 205 of FIG. 10 as compared with the outputs shown in the truth table of FIG. 12. As in FIG. 12, column I lists the 8 figures (FIGS. 1-8) being considered and the rows show the inputs to the logic of FIG. 10 for these 8 figures. For example, in the case of FIG. 1, a forward branch is indicated. Also in FIG. 1, PC 7=0 and BR 7=1. Such inputs resulted in the outputs of the various gates as shown in row A of FIG. 12 wherein gates 207 and 203 are shown to produce 0 outputs, indicating that they are both disabled, thereby automatically preventing any incrementing or decrementing in the circuit and thus indicating that no page boundary has been crossed. Further, since no page boundary has been crossed, the logic automatically selects the branch lying on the same page as does the PC address. The selected branch is the branch shown as BR address 126 in FIG. 1 and is a true forward branch.

Figure 2:
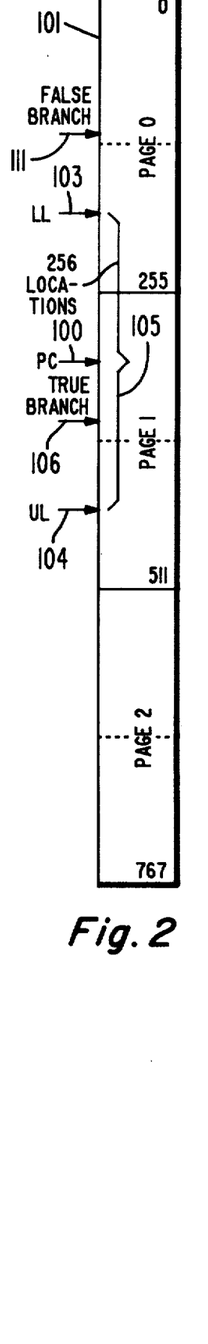
FIG. 2 is a schematic representation of three pages of memory and shows a case of a forward branch to the second half of a given page when the program counter is pointing to the first half thereof.

Consider now the conditions shown in FIG. 2 in which the BR address 106 is the true branch and is a forward branch. However, since the 7 LSB's of PC 100 are less than the 7 LSB's of BR addresses 106 and 111, i.e. V2<V1, the logic of FIG. 10 will make a tentative decision that the branch is a backward branch which is obviously incorrect from an examination of FIG. 2. However, the logic of FIG. 10 will detect such error and reverse the decision of the logic of FIG. 9 in the following manner.

An FBR is not indicated as shown by the 0 in column II, row B, of FIG. 11. However, a BBR is indicated as shown by the 1 in column III of row B. PC 7 is a 0 since PC address 100 lies in the lower half page of page 1. BR 7 is a 0 since BR addresses 106 and 111 both lie in the lower half of a page. Since PC 7=0 the output of AND gate 207 is a 0 as shown in column II, row B of FIG. 12. The tentative decision of a backward branch results in a 1 appearing on lead 199 in FIGS. 9 and 10 which is inverted by inverter 221 so that both inputs to NOR gate 203 are 0. This enables gate 203 and it produces a 1 output, priming AND gate 208.

However, it is necessary that the output of XOR gate 205 also be a 1 in order that AND gate 208 output a 1 when the branch enable signal on lead 209 occurs. But the inputs to leads 206 and 217 of XOR gate 205 are both 0's since both the PC address 100 and the BR address lie in a lower order half page. Accordingly, both AND gates 204 and 208 are disabled as indicated in columns V and VI of row B of FIG. 12.

The reversal of the tentative decision (FIG. 11, row B, column II) of the logic of FIG. 9 by the logic of FIG. 10, e.g., that the branch was in fact a true forward branch is shown in column VI of row B of FIG. 11. The rationale of such reversal is that since no incrementing or decrementing occurred, the selected branch address must lie on the same page as the PC address, which can be seen to be the case by examining FIG. 2.

Thus, in the case of FIG. 2, while gate 203 is enabled and supplies a 1 level output to gate 208, the XOR gate 205 was not, so that the condition required for decrementing or incrementing was not met, e.g., that in addition to one or the other of the gates 207 or 203 being enabled the XOR gate 205 must also be enabled.

Consider now the case of FIG. 3 where the PC address 140 is still in the lower order half of page 1 and a true backward branch is to be made to the BBR address 141 with the false FBR address 144 lying outside the relative branch range of the PC address 140 as indicated by bracket 145. The value V2 of the 7 LSB's of PC address 140 is less than the value V1 of the 7 LSB's of the BR addresses 141 or 144. This is indicated by the respective positions of the PC, BBR and FBR addresses on their half pages. As will be verified by the logic of FIGS. 9 and 10 and the charts of FIGS. 11 and 12, the branch is a true backward branch to the BBR address 141. Specifically, PC 7=0, and V2<V1 so that the BBR function appears as a 1 level on input lead 199 of FIG. 10. Thus, NOR gate 203 of FIG. 10 outputs a 1 level to input lead 216 of AND gate 208.

A 0 level is supplied to one input 206 of XOR gate 205 since PC 7=0 and a 1 is supplied to the other input lead 217 of XOR gate 205 since BR 7 is a 1, due to the branch address lying in the upper order half of a page, as shown in FIG. 3. Thus, with opposite inputs supplied thereto the XOR gate 205 supplies a 1 to the second input 218 of AND gate 208. Consequently, when the branch enable signal occurs on lead 209, AND gate 208 will output a 1 to decrementing logic 482 via lead 219 indicating that the LSB of the upper byte of the PC address is to be decremented by 1, the branch instruction having directed a branch which crosses page boundary 110 from page 1 to page 0. The charts of FIGS. 11 and 12 show the above results in chart form.

Figure 4:
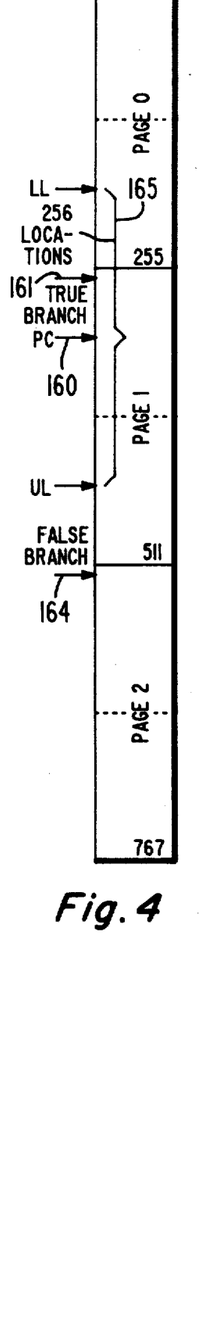
FIG. 4 is a schematic representation of three pages of memory and shows the case of a backward branch within the same half page as the program counter.

In the case of FIG. 4, PC address 160 still points to the lower half of page 1 and a true backward branch can be seen to be made to BBR address 161. A false forward branch, FBR address 164, clearly lies outside the range of the extended short branch defined by bracket 165. The value V2 of the 7 LSB's of PC address 160 is greater than the value V1 of the 7 LSB's of BBR address 161 and FBR 164. This is indicated by the relative positions of the PC, BBR, and FBR addresses on their pages. Thus, the logic of FIG. 10 will provide a 1 level output on lead 200 indicating falsely that the branch is a forward branch. To determine if a page boundary line was crossed, reference is again made to FIGS. 9 and 10. PC 7=0 since it points to a memory location in the lower order half of a page. Therefore, AND gate 207 provides a 0 output so that AND gate 204 is disabled. The erroneous forward branch signal on input lead 200 of AND gate 207 therefore has no effect. The 0 level of PC 7 is also supplied to one input 202 of NOR gate 203. A 1 level (a 0 inverted by inverter 221) is also supplied to the other input of gate 203 since the true branch at BBR address 161 is in the same half page as PC address 160. The eighth bit (PC 7) of PC address 160 and the eighth bit (BBR 7) of the true backward branch 161 are both 0's so that the output of XOR gate 205 is also a 0, thereby inhibiting AND gate 208 and preventing any decrementing of the LSB of the upper order address byte. The input signals to FIG. 10 and the outputs resulting therefrom with respect to FIG. 4 are shown in row D of the charts of FIGS. 11 and 12.

It is apparent from the cases of FIGS. 4 and 2 that if the branch address remains in the same half as the PC address, the output of XOR gate 205 will always be a 0 level, thus completely inhibiting AND gates 204 and 208 and preventing the incrementing or decrementing of the LSB of the upper order address byte.

FIG. 3 illustrates that if the PC is in the lower order half of a page and a true backward branch occurs, with the eighth bit thereof being a 1, a page boundary has been crossed. This is verified by enabled NOR gate 203 and enabled XOR gate 205 as shown in row C of FIGS. 11 and 12.

FIG. 1 illustrates that if the PC address is in the lower order half of a page and a true forward branch is made with the eighth bit becoming a 1 that no page boundary has been crossed. The foregoing is established by the disabling of AND gate 207 since PC 7=0 which in turn disables incrementing AND gate 204. NOR gate 203 is disabled because a 1 level appears on input 222 thereof resulting from the indication that the branch was not a backward branch (V2>V1).

Consider next the four cases shown in FIGS. 5, 6, 7, and 8 in which the PC address if always in the upper order half of a memory page. Consider first the case of FIG. 5 wherein a true forward branch is made to the memory location defined by FBR address 316. Since PC address 300 and FBR address 316 both lie in the same upper order half page, there will be no incrementing or decrementing of the higher order byte of the PC address. This is verified in FIG. 10 in that XOR gate 205 outputs a 0 level to inhibit both AND gates 204 and 208, both PC 7 and BR 7 being 1's. Since there is no incrementing or decrementing, the false branch defined by BBR address 311 is ignored and the true FBR address 316 becomes the new PC address.

Figure 6:
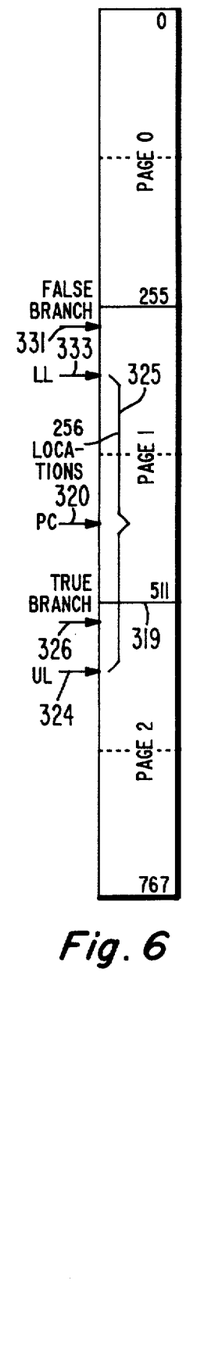
FIG. 6 is a schematic representation of three pages of memory and shows a forward branch across a page boundary when the program counter is in the upper half of the previous page.

In FIG. 6 there is shown a true branch from the upper order half of page 1 to the lower order half of page 2, crossing the boundary line 319 between pages 1 and 2. Since V2>V1, a forward branch is indicated. The foregoing is verified in FIG. 10 wherein a 1 level is supplied to input lead 201 of AND gate 207 since PC address 320 lies in an upper order half of a page and PC 7 is therefore a 1. Furthermore, a 1 level is supplied to input lead 200 of AND gate 207 since a forward branch is indicated, thus providing a 1 level output to prime AND gate 204. Further, since PC 7=1, and BR 7=0 (since the BR addresses 331 and 326 both lie in the lower order half of a page), a 1 level is outputted from XOR gate 205 which is supplied to a second input of AND gate 204. Accordingly, when the branch enable pulse occurs on lead 209 there is an output from AND gate 204 to incrementing logic 481 to increment the LSB of the upper order address byte of the PC address. The foregoing operation of FIG. 6 is shown and verified in rows F of the truth tables of FIGS. 11 and 12.

Figure 7:
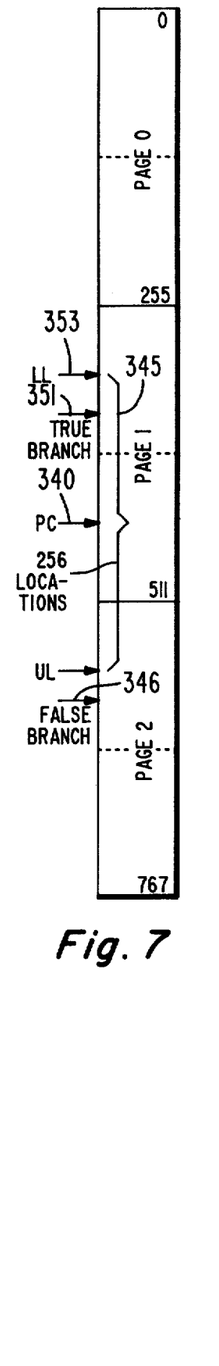
FIG. 7 is a schematic representation of three pages of memory and shows a backward branch to the lower half of a page when the program is in the upper half of the same page.

In FIG. 7, there is shown the case where the branch is a true backward branch (BBR address 351) which can be seen to be inside the lower limit indicated by arrow 353. Such BBR address 351 and FBR address 346 lie in the lower order half of pages 1 and 2, respectively, and therefore have a 0 in their eighth bit position (BR 7=0). Further, since PC 7=1 XOR gate 205 of FIG. 10 outputs a 1 level to AND gates 204 and 208, thereby priming them. However, the value V2 of the 7 LSB's of PC address 340 is less than the value V1 of the 7 LSB's of the BR addresses, thereby indicating BBR 351 is the true branch which can be seen to be the case in FIG. 7. No decrementing is required since BBR 351 lies in the same page as PC address 340 and no page boundary line was crossed.

The foregoing is verified in FIG. 10 where, as V2<V1, there is a 1 on lead 199 to provide a 0 level on input lead 222 of NOR gate 203. However, PC 7=1 which disabled gate 203 and thereby also disables AND gate 208. Since the forward branch input 200 to AND gate 207 is a 0 level, AND gate 204 is also disabled. Thus, no incrementing or decrementing of the higher order address byte occurs, whereby the false FBR address 346 is ignored. The foregoing discussion is verified in row G of FIGS. 11 and 12.

Figure 8:
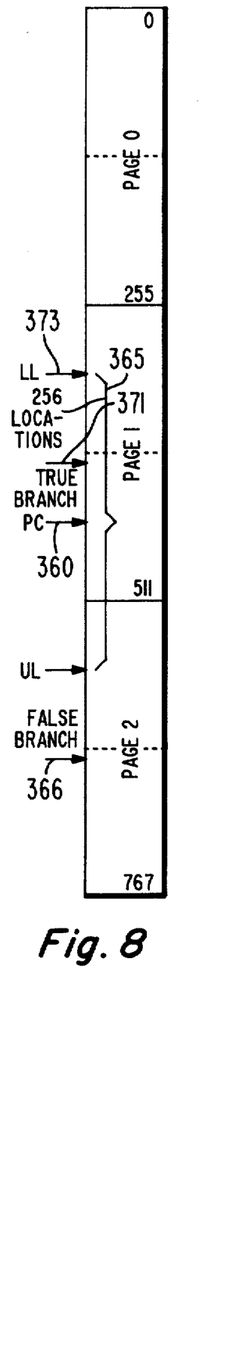
FIG. 8 is a schematic representation of three pages of memory and shows a backward branch to the same upper half page in which the program counter is.

In FIG. 8, there is shown the case where a true backward branch (BBR address 371) is made but within the same half page as PC address 360. As discussed above in connection with the case of FIGS. 2, 4, and 5, XOR gate 205 of FIG. 10 accordingly outputs a 0 level to inhibit both AND gates 204 and 208 so that FBR address 366, which crosses a page boundary, is ignored. The foregoing is verified in row H of FIGS. 11 and 12.

Figure 5:
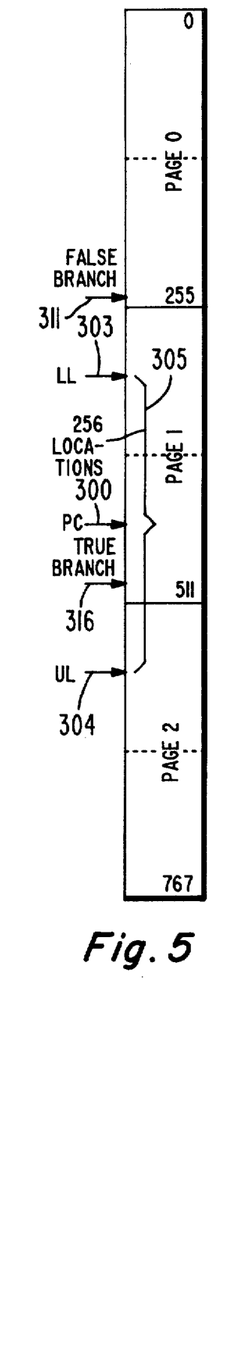
FIG. 5 is a schematic representation of three pages of memory and shows an example of a forward branch when the program counter is in the same upper half of a given page.

As in the case of FIGS. 2 and 4, the cases of FIGS. 5 and 8 illustrate that when a branch is made in the same half page as the PC address, no incrementing or decrementing can occur in the logic of FIG. 10 because the output of XOR gate 205 is a 0 level. Further, FIG. 7 shows that when the PC address is in the upper half of a page, and the value V2 of the seven LSB's of the PC address is less than the seven LSB's (V1) of the branch address, a true backward branch occurs but with no page boundaries being crossed since PC 7=1, thereby disabling NOR gate 203 and consequently disabling AND gate 208.

FIG. 6 illustrates that when the PC is in the upper order half of the page and a true forward branch occurs, a page boundary crossing can occur. Such page boundary crossing is indicated in such a case by BR 7 being equal to 0 and PC 7 being a 1. Consequently, XOR gate 205 of FIG. 11 is energized to prime AND gate 204. Further, since it is a forward branch (V2>V1) and PC 7=1, AND gate 207 is enabled to supply a 1 level to AND gate 204. Thus, when the branch enable pulse occurs on lead 209, AND gate 204 is enabled to supply a signal to incrementing logic 481 to increment the LSB of upper order byte of the PC address.

Reference is now made to FIG. 9, which compares the value V2 of the seven LSB's of the PC address with the value V1 of the seven LSB's of the branch address starting with the highest order bits PC 6 and BR 6; and working downwardly in descending order to determine which of V2 or V1 is the larger quantity. The comparison of each corresponding pair of bits of the two sets of seven LSB's is made simultaneously with each pair of bits being compared in one of the dotted blocks 500, 501, 502 or 503. Only four of such comparison logic blocks are shown with the remaining three logic blocks for comparing PC 3, PC 2, and PC 1 with BR 3, BR 2, and BR 1 being designated generally by the dotted line 504.

The logic of FIG. 9 is constructed in such a manner that even though all of the pairs of bits are compared simultaneously, if PC 6 and BR 6, which are the most significant bits of the seven pairs of bits being compared, are different, i.e. one of them is a 1 and the other a 0, then all of the remaining stages of comparison are disabled. If PC 6 and BR 6 have the same value, but PC 5 and BR 5 have different values, then, the logic within block 501 will determine the comparative values of V1 and V2 and will disable all subsequent comparisons. In the example being discussed re FIG. 9, assume that PC 6 and BR 6 (block 500) are the same but that PC 5 is greater than BR 6 (block 501). PC 6 and BR 6 are supplied to the inputs of XOR gate 515 and since they are the same, i.e., either both 1's or both 0's, the output of XOR gate 515 is a 0 level which inhibits both AND gates 516 and 517. Therefore, 0 levels are supplied via leads 519 and 520 to buses 511 and 510, respectively. The two 0 level outputs of AND gates 516 and 517 are also supplied through OR gate 518 to three different places in the logic within block 501. Specifically, the 0 level output of OR gate 518 is supplied to the inhibit inputs of AND gates 525 and 526 and to prime them and to OR gate 505. Furthermore, since PC 5 and BR 5, which are supplied to the inputs of XOR gate 527 via leads 528 and 529, are unequal, the output of XOR gate 527 will be a 1 level which is supplied via lead 530 to a second input of each of AND gates 525 and 526.

Since PC 5 and BR 5 are unequal, one of them must be a binary 1 and greater than the other, which must be a binary 0, and therefore determines which of the two seven bit quantities, V2 and V1 is the larger. Assume that PC 5 is the greater, i.e., is a binary 1 and that BR 5 is a binary 0. Therefore, AND gate 525 will output a 1 level and AND gate 526 will output a 0 level. The 1 level output from AND gate 525 is supplied to one input of OR gate 532 so that the output thereof is a 1 level. The 0 level output from AND gate 526 is supplied to OR gate 533 so that the output remains a 0 level. It should be noted that the 1 level output of OR gate 532 will pass through all subsequent OR gates including OR gates 550 and 534 and will appear as a 1 level on output lead 200, which indicates a forward branch.

Had BR 5 been greater than PC 5, a 1 level would have been generated on the output terminal of AND gate 526 which would have passed through OR gate 533, OR gate 551, and OR gate 536 to output lead 199, indicating a backward branch.

The output of OR gate 505 is a 1 level since the output of AND gate 525 is a 1 level. Thus, the two AND gates 540 and 542 within comparison block 502 are disabled and provide 0 levels to one input of each of OR gates 550 and 551. However, since the other input of OR gate 550 is a 1 level, a 1 level will appear on the output of OR gate 550, thus carrying the branch forward decision forward in the system. It should be noted that even though PC 4 and BR 4 are different and the output of XOR gate 555 is a 1 level, the comparison block 502 is disabled since AND gates 540 and 542 are both disabled. In a similar manner, it can be shown that the corresponding AND gates of all subsequent logic blocks, such as the AND gates 560 and 561 of logic block 503 are disabled by the 1 level carried through OR gate 562.

The branch backward signal, appearing on lead 199 is supplied to the branch backward input 199 of FIG. 10 where it is inverted to a 0 by inverter 221 and supplied to inverting input 222 of negative AND gate 203. Similarly, the branch forward signal appearing on lead 200 of FIG. 9 is supplied to input lead 200 of FIG. 10, as discussed hereinbefore.

What is claimed is:

1. In a data processing system employing a program counter (PC), and a memory divided into pages each containing $2^N$ memory locations, and in which each of the memory location addresses comprises two bytes, an upper order byte, and a lower order byte, with each byte comprising N bits, an improved method for executing a branch instruction directing a branch from one memory address in one page of the memory to a second memory address in a location not beyond an adjacent page of the memory, but independent of whether the branch crosses a page boundary in the memory, and comprising the steps of:

determining if the binary value V1 represented by the (N-1) least significant bits (LSB's) of the lower order byte of the branch address is greater than the binary value V2 represented by the (N-1) LSB's of the lower order byte of the address to which the PC is pointing (the PC address);

determining if PC N≠BR N where PC N is the most significant bit of the lower order byte of the PC address and BR N is the most significant bit of the lower order byte of the branch address;

incrementing by 1 the upper order byte of the PC address if V1<V2, PC N=1, and PC N≠BR N;

decrementing by 1 the upper order byte of the PC address if V1>V2, PC N=0, and PC N≠BR N; and replacing the lower order byte of the PC address with the lower order byte of the branch address.

2. In a data processing system employing a program counter (PC), and a memory divided into pages each containing $2^N$ memory locations, and in which each of the memory location addresses comprises two bytes, an upper order byte and a lower order byte, with each byte comprising N bits, a structure for executing a branch instruction containing a branch address and directing a branch from one memory address in one page of the memory to a second memory address at a location not beyond an adjacent page of the memory, but independent of whether a page boundary in said memory is crossed during said branch, and comprising:

first logic means responsive to the binary value V2 represented by the (N-1) least significant bits (LSB's) of the lower order byte of the address to which the PC is pointing (the PC address), and the binary value V1 represented by the (N-1) LSB's of the lower order byte of said branch address to produce a first output signal if V1<V2 and a second output signal if V1>V2;

second logic means responsive to the most significant bit (MSB) PC N of the lower order byte of the PC address and the MSB BR N of the lower order byte of said branch address to produce a third output signal if PC N≠BR N;

third logic means responsive to the condition PC N=1, and to said first and third output signals to provide a fourth output signal for incrementing said upper order byte of said PC address by one;

fourth logic means responsive to the condition PC N=0, and to said second and third output signals to provide a fifth output signal for decrementing said upper order byte of said PC address by one; and fifth logic means for replacing the lower order byte of the PC address with the lower order byte of the branch address after the execution of said branch instruction.

3. In a data processor system employing a program counter (PC), and a memory divided into pages each containing $2^N$ memory locations, and in which each of the memory location addresses comprises two bytes, an upper order byte and a lower order byte, with each byte comprising N bits, a structure for executing a branch instruction containing a branch address and directing a branch from one memory address in one page of the memory to a second memory address at a location not beyond a adjacent page of the memory, but independent of whether an adjacent page boundary is crossed during said branch and comprising:

first logic means responsive to the binary value V2 represented by the (N-1) least significant bits (LSB's) of the lower order byte of the address to which the PC is pointing (the PC address) and the binary value V1 represented by the (N-1) LSB's of the lower order byte of said branch (BR) address to produce a first output signal indicating which of V1 and V2 is the larger; and second logic means responsive to the conditions PC N≠BR N, PC N=1, and V1<V2 to generate a first signal indicating the incrementing of the upper order byte of the PC address, and further responsive to the conditions PC N≠BR N, PC N=0 and V1>V2 to generate a second signal indicating the decrementing of the upper order byte of the PC address, where PC N and BR N are the most significant bit of the lower order byte of the PC address and the lower order byte of said branch address, respectively.

* * * * *